United States Patent
Higashiyama

(10) Patent No.: US 11,599,640 B2
(45) Date of Patent: Mar. 7, 2023

(54) SECURITY DEVICE AND EMBEDDED DEVICE

(71) Applicant: Mitsubishi Electric Corporation, Tokyo (JP)

(72) Inventor: Tomohiko Higashiyama, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 257 days.

(21) Appl. No.: 16/964,609

(22) PCT Filed: Apr. 10, 2018

(86) PCT No.: PCT/JP2018/014982
§ 371 (c)(1),
(2) Date: Jul. 24, 2020

(87) PCT Pub. No.: WO2019/198137
PCT Pub. Date: Oct. 17, 2019

(65) Prior Publication Data
US 2021/0049275 A1     Feb. 18, 2021

(51) Int. Cl.
*G06F 21/56* (2013.01)
*G06F 21/57* (2013.01)

(52) U.S. Cl.
CPC .......... *G06F 21/566* (2013.01); *G06F 21/577* (2013.01); *G06F 2221/034* (2013.01)

(58) Field of Classification Search
CPC . G06F 21/566; G06F 21/577; G06F 2221/034
See application file for complete search history.

(56) References Cited

U.S. PATENT DOCUMENTS

| 2010/0100706 A1 | 4/2010 | Inoue et al. |
| 2013/0227650 A1 | 8/2013 | Miyake |

(Continued)

FOREIGN PATENT DOCUMENTS

| JP | 2012-104049 A | 5/2012 |
| JP | 2012-104151 A | 5/2012 |

(Continued)

OTHER PUBLICATIONS

International Search Report and Written Opinion dated Jun. 26, 2018 for PCT/JP2018/014982 filed on Apr. 10, 2018, 6 pages including English Translation of the International Search Report.

*Primary Examiner* — Tri M Tran
(74) *Attorney, Agent, or Firm* — Xsensus LLP

(57) ABSTRACT

A security device includes an attack detection part, a security risk state determination part, and an execution environment controller. The attack detection part detects a cyber attack on an embedded device controlled by an embedded control device. The security risk state determination part determines a security risk state indicating at least one of a type and degree of risk of threat in a security caused by the cyber attack based on a result of the detection. The execution environment controller is included in the embedded control device, determines a security function against the cyber attack in accordance with the security risk state, and constitutes an execution environment of the security function in the embedded control device so that the embedded control device can execute the security function.

12 Claims, 12 Drawing Sheets

(56) References Cited

U.S. PATENT DOCUMENTS

2017/0355326 A1* 12/2017 Ben Noon ............ G06F 21/554
2019/0007215 A1   1/2019 Hakuta et al.
2020/0387605 A1* 12/2020 Gilad ................... G06F 21/566

FOREIGN PATENT DOCUMENTS

JP    2016-143963 A    8/2016
WO    2017/002405 A1   1/2017

* cited by examiner

F I G. 4

| | SECURITY RISK STATE | SECURITY FUNCTION | SECURITY FUNCTION EXECUTION ENVIRONMENT | MAIN FUNCTION EXECUTION ENVIRONMENT |
|---|---|---|---|---|
| (1) | UNAUTHENTICATED MESSAGE RECEPTION FREQUENCY (HIGH) 1361 | MESSAGE AUTHENTICATION (COMPLETENESS, AUTHENTICITY) + PACKET MONITORING + DATA ENCRYPTION 1381 | CPU CORE: 100% CPU OPERATION MODE: SECURE MODE MEMORY: 1MB CACHE: 256KB | CPU CORE: 300% CPU OPERATION MODE: NORMAL MODE MEMORY: 0KB CACHE: 0KB |
| (2) | UNAUTHENTICATED MESSAGE RECEPTION FREQUENCY (LOW) 1362 | DATA FORMAT MONITORING 1382 | CPU CORE: 30% CPU OPERATION MODE: NORMAL MODE MEMORY: 128KB CACHE: 0KB | CPU CORE: 270% CPU OPERATION MODE: NORMAL MODE MEMORY: 0KB CACHE: 0KB |
| (3) | DETECT ATTACK SCENARIO (HACKING, IMPERSONATION) 1363 | MESSAGE AUTHENTICATION (COMPLETENESS, AUTHENTICITY) + DATA ENCRYPTION 1383 | CPU CORE: 70% CPU OPERATION MODE: SECURE MODE MEMORY: 512KB CACHE: 64KB | CPU CORE: 330% CPU OPERATION MODE: NORMAL MODE MEMORY: 0KB CACHE: 0KB |
| (4) | DETECT ATTACK SCENARIO (ACQUIRE UNAUTHENTICATED DATA) 1364 | DATA ENCRYPTION 1384 | CPU CORE: 50% CPU OPERATION MODE: SECURE MODE MEMORY: 128KB CACHE: 0KB | CPU CORE: 350% CPU OPERATION MODE: NORMAL MODE MEMORY: 0KB CACHE: 0KB |
| (5) | UNAUTHENTICATED CONNECTION 1365 | MESSAGE AUTHENTICATION + RESOURCE MONITORING + DATA ENCRYPTION 1385 | CPU CORE: 50% CPU OPERATION MODE: PRIVILEGED MODE MEMORY: 256KB CACHE: 128KB | CPU CORE: 250% CPU OPERATION MODE: NORMAL MODE MEMORY: 0KB CACHE: 0KB |

IN SECURITY ENHANCEMENT OPERATION

SECURITY DEVICE AND EMBEDDED DEVICE

CROSS-REFERENCE TO RELATED APPLICATION

The present application is based on PCT filing PCT/JP2018/014982, filed Apr. 10, 2018, the entire contents of which are incorporated herein by reference.

TECHNICAL FIELD

The present invention relates to a security device against a cyber attack on an embedded device controlled by an embedded control device and an embedded device including the security device.

BACKGROUND ART

An embedded device is mounted on a device of a moving body such as an automobile, a household appliance, and a factory automation (FA) apparatus. The embedded device is controlled by the embedded control device. For example, an in-vehicle device is mounted on an automobile. The in-vehicle device is controlled by a vehicle engine control unit (ECU).

Conventionally, the embedded device has been used in stand-alone form. However, in recent years, the embedded device is increasingly used in a state of being connected to an external network in response to a trend for Internet of things (IoT).

The embedded device used in the state of being connected to the external network has a possibility of being exposed to the cyber attack. Thus, required in recent years is that a security function for protecting the embedded device from the cyber attack is mounted on the embedded control device. For example, an authentication system of authenticating an information processing device which is not mounted on a vehicle by sharing a shared key between an embedded control device mounted on the vehicle and the information processing device, and exchanging a coded message authentication code and response code therebetween in communication. A technique described in Patent Document 1 is an example thereof.

PRIOR ART DOCUMENTS

Patent Documents

Patent Document 1: WO 2017/002405

SUMMARY

Problem to be Solved by the Invention

However, when the security function against the cyber attack is mounted on the embedded control device, there is a problem that a computer resource mounted on the embedded control device is limited. That is to say, there is a problem that a computer resource such as a central processing unit (CPU), a read-only memory (ROM), and a random access memory (RAM) mounted on the embedded control device is limited compared with a personal computer (PC) in which an introduction of an information security technique is promoted. Thus, when a high-security function such as encryption processing against the cyber attack is mounted on the embedded control device, a main function mounted on the embedded control device needs to be lowered in some cases. This problem is surely resolved by enhancing the computer resource mounted on the embedded control device, however, the enhancement of the computer resource mounted on the embedded control device causes increase in cast of the embedded control device.

The present invention is achieved in consideration of these problems. A problem to be solved by the present invention is to appropriately execute a security function while suppressing an influence on an execution of a main function in an embedded control device.

Means to Solve the Problem

A first aspect of the present invention is directed to a security device.

A security device includes an attack detection part, a security risk state determination part, and an execution environment controller.

The attack detection part detects a cyber attack on an embedded device controlled by the embedded control device.

The security risk state determination part determines a security risk state indicating at least one of a type and degree of risk of threat in a security caused by the cyber attack based on a result of the detection.

The execution environment controller is included in the embedded control device, determines a security function against the cyber attack in accordance with the security risk state, and constitutes an execution environment of the security function in the embedded control device so that the embedded control device can execute the security function.

A second aspect of the present invention is directed to an embedded device including the security device described above.

Effects of the Invention

In the present invention, the execution environment of the security function in the embedded control device is constituted so that the embedded control device can execute the security function against the cyber attack in accordance with at least one of the type and degree of risk of threat in the security caused by the cyber attack. Thus, the security function can be appropriately executed while suppressing an influence on the execution of the main function in the embedded control device.

These and other objects, features, aspects and advantages of the present invention will become more apparent from the following detailed description of the present invention when taken in conjunction with the accompanying drawings.

BRIEF DESCRIPTION OF DRAWINGS

FIG. 4 A drawing schematically illustrating a security function table stored in an embedded control device constituting the security device according to the embodiments 1 and 2.

DESCRIPTION OF EMBODIMENT(S)

1 Embodiment 1

1.1 Outline of Embedded Device

Figure 1:
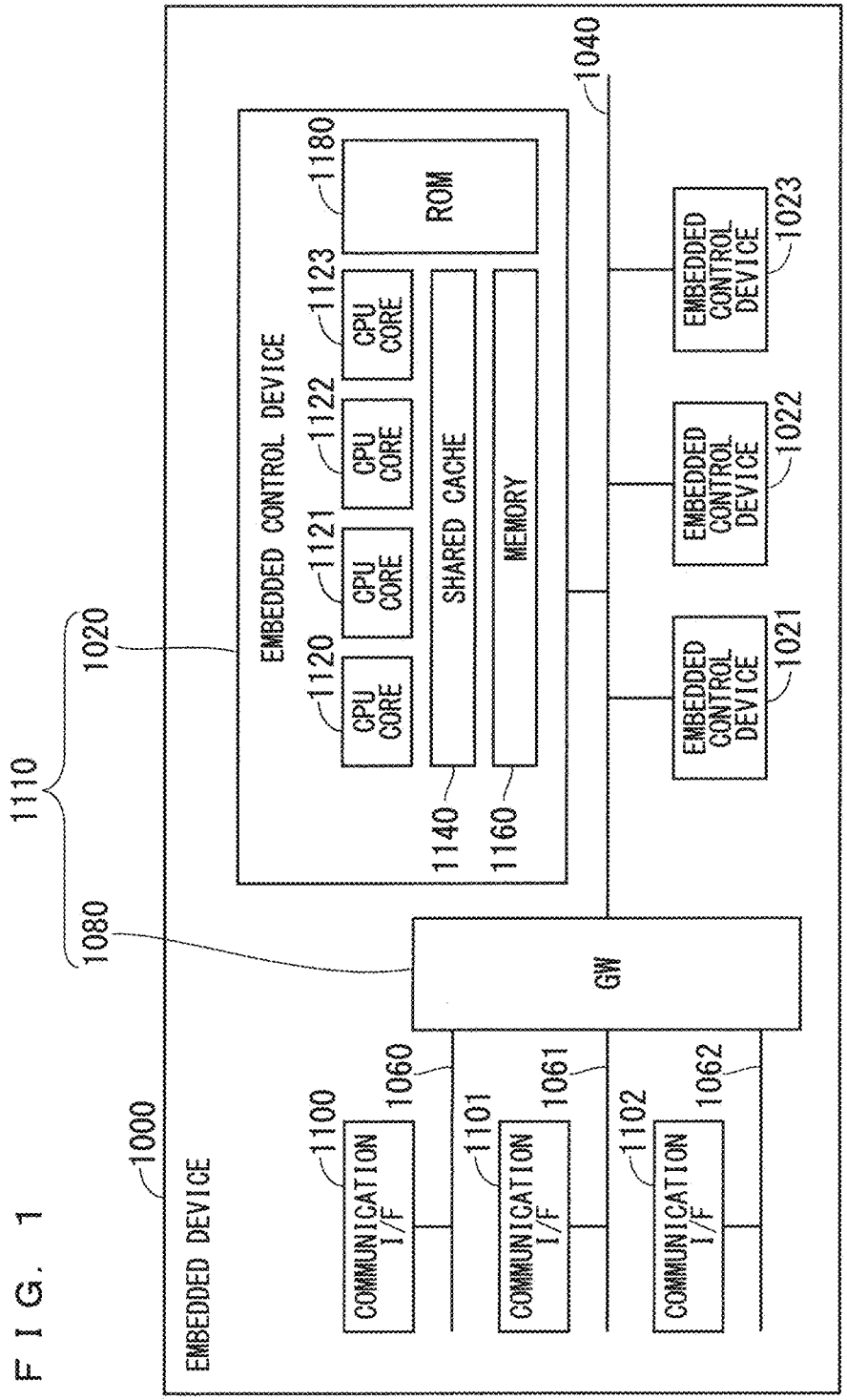
FIG. 1 A block diagram schematically illustrating an embedded device including a security device according to embodiments 1 and 2.

FIG. 1 is a block diagram schematically illustrating an embedded device including a security device according to an embodiment 1.

The embedded device 1000 illustrated in FIG. 1 includes an embedded control device 1020, an embedded control device 1021, an embedded control device 1022, an embedded control device 1023, a control system network 1040, an external connection system network 1060, an external connection system network 1061, an external connection system network 1062, a gateway (GW) 1080, a communication interface (I/F) 1100, a communication I/F 1101, and a communication interface I/F 1102. The embedded device 1000 may include an element other than these elements.

The embedded device 1000 is mounted on a device of a moving body such as an automobile, a household appliance, and a factory automation (FA) apparatus. In the description hereinafter, the embedded device 1000 is an in-vehicle device mounted on an automobile, and the embedded control devices 1020, 1021, 1022, and 1023 are vehicle engine control units (ECU) controlling a traveling of the automobile.

The GW 1080 and the embedded control device 1020 constitute a security device 1110 against a cyber attack on the embedded device 1000. The GW 1080 does not constitute the security device 1110 in some cases. Each of the embedded control devices 1021, 1022, or 1023 constitutes the security device 1110 in some cases.

The embedded control device 1020 executes a main function of controlling the embedded device 1000, and executes a security function against a cyber attack on the embedded device 1000. The embedded control devices 1021, 1022, and 1023 executes a main function of controlling the embedded device 1000, but does not execute a security function against a cyber attack on the embedded device 1000. However, the present configuration is one example, and the security function made up on the GW 1080 may be made up on the embedded control device 1021, 1022, or 1023 as described above.

The embedded control devices 1020, 1021, 1022, and 1023 are communicably connected to the control system network 1040. Control data exchanged between devices such as the embedded control devices 1020, 1021, 1022, and 1023 included in the embedded device 1000 flows in the control system network 1040.

The external connection system networks 1060, 1061, and 1062 are communicably connected to the communication I/Fs 1100, 1101, and 1102, respectively. The external connection system networks 1060, 1061, and 1062 are communicably connected to an information communication device located outside the embedded device 1000 via the communication I/Fs 1100, 1101, and 1102, respectively. Communication data exchanged between a device such as the embedded control devices 1020, 1021, 1022, and 1023 included in the embedded device 1000 and the information communication device located outside the embedded device 1000 flows in the external connection system networks 1060, 1061, and 1062.

The external connection system networks 1060, 1061, and 1062 are communicably connected to the control system network 1040 via the GW 1080.

An embedded control device group made up of the embedded control devices 1020, 1021, 1022, and 1023 may be replaced with the other embedded control device group or a single embedded control device. Network made up of the control system network 1040, the external connection system network 1060, the external connection system network 1061, the external connection system network 1062, and the GW 1080 may be replaced with the other network. The embedded control device executing the security function may be changed from the embedded control device 1020 to the embedded control device 1021, 1022, or 1023.

The embedded control device 1020 includes a central processing unit (CPU) core 1120, a CPU core 1121, a CPU core 1122, a CPU core 1123, an inter-core shared cache 1140, an inter-core shared memory 1160, and a read-only memory (ROM) 1180. The embedded control device 1020 may include an element other than these elements.

1.2 Security Device

Figure 2:
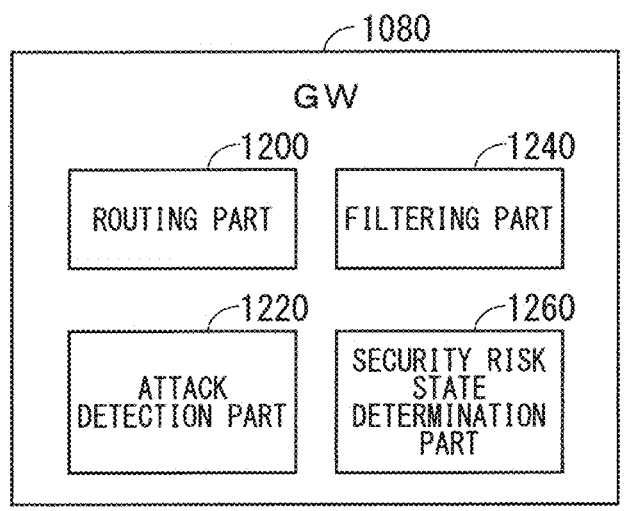
FIG. 2 A block diagram schematically illustrating a functional configuration of a gateway (GW) constituting the security device according to the embodiments 1 and 2.

FIG. 2 is a block diagram schematically illustrating a functional configuration of a GW constituting a security device according to the embodiment 1.

The GW 1080 includes a routing part 1200, an attack detection part 1220, a filtering part 1240, and a security risk state determination part 1260 as illustrated in FIG. 2. These elements are achieved when the GW executes an installed program. All or some of these elements may be achieved by hardware which does not execute a program. The GW 1080 may include an element other than these elements. The attack detection part 1220 and the security risk state determination part 1260 may be mounted on the embedded control device 1020, 1021, 1022, or 1023.

When the routing part 1200 transmits packets, which have been received via a network, via the other network, the routing part 1200 performs a routing of appropriately selecting the other network. The routing is a function originally included in the GW1080.

The attack detection part 1220 detects a cyber attack on the embedded device 1000. Examples of the cyber attack on which the detection is performed include a cyber attack on the embedded device 1000 from an outside of the embedded device 1000 such as an outside of the automobile and a cyber attack on the embedded device 1000 from a device improperly attached to the embedded device 1000. The attack detection part 1220 detects attack data transmitted via an external network, for example, thereby detecting the cyber attack on the embedded device 1000.

The filtering part 1240 performs a filtering of data to prevent the attack data transmitted by the cyber attack from flowing from the external connection system network 1060, 1061, or 1062 into the control system network 1040, and to prevent secret data from flowing from the control system network 1040 out of the external connection system network 1060, 1061, or 1062.

The security risk state determination part 1260 determines a security risk state indicating at least one of a type and degree of risk of threat in a security caused by the cyber attack based on a result of detection of the cyber attack on the embedded device 1000. A notification of the determined security risk state is transmitted from the GW 1080 to the embedded control device 1020 via the control system network 1040.

Figure 3:
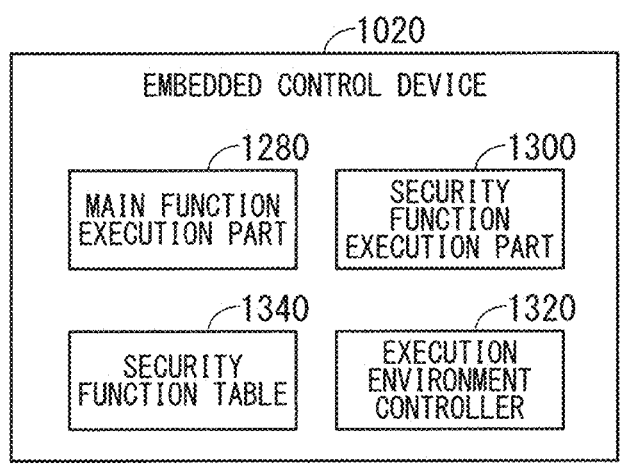
FIG. 3 A block diagram schematically illustrating a functional configuration of the embedded control device constituting the security device according to the embodiment 1.

FIG. 3 is a block diagram schematically illustrating a functional configuration of the embedded control device constituting the security device according to the embodiment 1.

The embedded control device 1020 includes a main function execution part 1280, a security function execution part 1300, and an execution environment controller 1320 as illustrated in FIG. 3. These elements are achieved when the GW executes an installed program. All or some of these elements may be achieved by hardware which does not execute a program. A storage medium such as the ROM 1180 stores a security function table 1340 in the embedded control device 1020. The embedded control device 1020 may include an element other than these elements.

The main function execution part 1280 executes a main function of controlling the embedded device 1000.

The security function execution part 1300 executes a security function against the cyber attack on the embedded device 1000. A protection against the cyber attack is given to the embedded device 1000 by the security function.

The execution environment controller 1320 determines the security function executed by the embedded control device 1020 in accordance with the security risk state determined by the security risk state determination part 1260. The execution environment controller 1320 constitutes an execution environment of the security function in the embedded control device so that the embedded control device 1020 can execute the determined security function in accordance with the security risk state determined by the security risk state determination part 1260. The execution environment controller 1320 constitutes an execution environment of the main function in the embedded control device 1020 in accordance with the security risk state determined by the security risk state determination part 1260.

The execution environment of each function of the security function and the main function is an operation environment of the embedded control device 1020 necessary to execute each function. The execution environment of each function is defined by a computer resource allocated to each function and an operation mode of a CPU core, for example. The computer resource indicates the number of CPU cores, an upper limit of a usage rate of CPU cores 1020, 1021, 1022, and 1023, an upper limit of a used amount of the inter-core shared cache 1140, and an upper limit of a used amount of the inter-core shared memory 1160, for example. The execution environment of each function may be defined by a setting other than the computer resource allocated to each function and the operation mode of the CPU core in place of or in addition to the computer resource allocated to each function and the operation mode of the CPU core. The setting indicates an upper limit of a used amount of a network bandwidth, an accessible input-output (I/O) port, an accessible dedicated accelerator, an allocation of the CPU core notified of an interrupt, for example. When the embedded control device 1020 includes a system of performing a priority base scheduling, the execution environment of each function may be defined by a degree of priority and cycle of a task executing each function, for example, in place of the usage rate of CPU cores 1020, 1021, 1022, and 1023.

FIG. 4 is a drawing schematically illustrating a security function table stored in the embedded control device constituting the security device according to the embodiment 1.

The execution environment controller 1320 refers to the security function table 1340 illustrated in FIG. 4 in determining the security function, configuration contents of the execution environment of the security function, and configuration contents of the execution environment of the main function.

The security function table 1340 includes a plurality of security risk states 1361, 1362, 1363, 1364, and 1365. The security function table 1340 includes a plurality of security functions 1381, 1382, 1383, 1384, and 1385 corresponding to a plurality of security risk states 1361, 1362, 1363, 1364, and 1365, respectively, configuration contents 1401, 1402, 1403, 1404, and 1405 of execution environments of the plurality of security functions corresponding to the plurality of security risk states 1361, 1362, 1363, 1364, and 1365, respectively, and configuration contents 1421, 1422, 1423, 1424, and 1425 of execution environments of a plurality of main functions corresponding to the plurality of security risk states 1361, 1362, 1363, 1364, and 1365, respectively. The security function table 1340 includes a plurality of identifiers (ID) 1441, 1442, 1443, 1444, and 1445 corresponding to the plurality of security risk states 1361, 1362, 1363, 1364, and 1365, respectively. Each ID of the plurality of IDs 1441, 1442, 1443, 1444, and 1445 is given to a set of the security risk state corresponding to each ID, the security function corresponding to the security risk state, the configuration content of the execution environment of the security function corresponding to the security risk state, and the configuration content of the execution environment of the main function corresponding to the security risk state.

The configuration content of the execution environment of the security function corresponding to each security risk state of the plurality of security risk states 1361, 1362, 1363, 1364, and 1365 is determined based on an estimation of computer resource necessary to complete the security function corresponding to each security risk state in a set period of time and a result thereof.

The configuration content of the execution environment of the main function corresponding to each security risk state of the plurality of security risk states 1361, 1362, 1363, 1364, and 1365 is determined by obtaining a computer resource which can be allocated to the main function from a computer resource mounted on the embedded control device 1020 and a computer resource required in the configuration content of the execution environment of the security function corresponding to each security risk state.

The execution environment controller 1320 refers to the security function table 1340, and selects the security risk state coinciding with the security risk state determined by the security risk state determination part 1260 from the plurality of security risk states 1361, 1362, 1363, 1364, and 1365 included in the security function table 1340. The execution environment controller 1320 selects the security function corresponding to the selected security risk state from the plurality of security functions 1381, 1382, 1383, 1384, and 1385 included in the security function table 1340. The execution environment controller 1320 selects the configuration content of the execution environment of the security function corresponding to the selected security risk state from the configuration contents 1401, 1402, 1403, 1404, and 1405 of the execution environment of the plurality of security functions included in the security function table 1340. The execution environment controller 1320 selects the configuration content of the execution environment of the main function corresponding to the selected security risk state from the configuration contents 1421, 1422, 1423, 1424, and 1425 of the execution environment of the plurality of main functions included in the security function table 1340.

The execution environment controller 1320 sets the selected security function to a security function executed by the embedded control device 1020. The execution environment controller 1320 makes the execution environment of the constituted security function include the configuration content of the execution environment of the selected security function. The execution environment controller 1320 makes the execution environment of the constituted main function include the configuration content of the execution environment of the selected main function.

According to the above processes, the security function executed by the embedded control device 1020 is determined in accordance with the security risk state determined by the security risk state determination part 1260, and the execution environment of the security function and the execution environment of the main function in the embedded control device 1020 are constituted.

It is also applicable that the execution environment controller 1320 determines the security function executed by the embedded control device 1020 without referring to the security function table 1340 to constitute the execute environment of the security function and the execution environment of the main function in the embedded control device 1020. For example, the execution environment controller 1320 may perform these processes using a program performing a condition determination, or perform these processes using a learning program performing a machine learning.

1.3 Security Function Table

The security risk state 1361 illustrated in FIG. 4 indicates that an unauthenticated message is received with a high receiving frequency. The security risk state 1361 assumes a threat such as a transmission of unauthenticated data for purpose of unauthenticated control of an automobile, a denial of service (DoS) attack, and an unauthenticated acquisition of data for purpose of a theft of secret data, for example.

The security function 1381 corresponding to the security risk state 1361 includes a message authentication function, a packet monitoring, and a data encryption. According to the message authentication function, a completeness of a message and a validity (authenticity) of a source of a message can be ensured, and it is possible to counteract the transmission of the unauthenticated data. According to the packet monitoring, a communication volume in the control system network 1040 can be monitored, and a specific packet can be blocked when an abnormal traffic is detected, thus it is possible to counteract the DoS attack. According to the data encryption, the monitoring of transmitted-received data can be prevented, thus it is possible to counteract the unauthenticated acquisition of data.

The configuration content 1401 of the execution environment of the security function corresponding to the security risk state 1361 includes the upper limit of the usage rate of the CPU cores 1020, 1021, 1022, and 1023, the operation mode of the CPU core, the upper limit of the used amount of the inter-core shared cache 1140, and the upper limit of the used amount of the inter-core shared memory 1160. The configuration content 1401 of the execution environment of the security function defines the execution environment of the security function necessary to execute the security function 1381.

The upper limit of the usage rate of the CPU cores 1020, 1021, 1022, and 1023, the upper limit of the used amount of the inter-core shared cache 1140, and the upper limit of the used amount of the inter-core shared memory 1160 included in the configuration content 1401 of the execution environment of the security function are larger than the upper limit of the usage rate of the CPU cores 1020, 1021, 1022, and 1023, the upper limit of the used amount of the inter-core shared cache 1140, and the upper limit of the used amount of the inter-core shared memory 1160 included in the configuration contents 1402, 1403, 1404, and 1405 of the execution environment of the security function. Accordingly, the data encryption requiring a complicated calculation can be achieved.

The operation mode of the CPU core included in the configuration content 1401 of the execution environment of the security function is a secure mode. Accordingly, access to a key necessary to execute the message authentication function and the data encryption can be achieved.

The security risk state 1362 indicates that an unauthenticated message is received with a low receiving frequency. The receiving frequency of the unauthenticated message in the security risk state 1362 is lower than the receiving frequency of the unauthenticated message in the security risk state 1361. The security risk state 1362 assumes the transmission of the unauthenticated data.

The security function 1382 corresponding to the security risk state 1362 includes a data format monitoring. The data format monitoring indicates a process of monitoring whether or not data is out of range of value when the range of value which the data can take is defined in specifications, and considering the data to be falsified unauthenticated data when the data is out of range of the value. For example, when a range of value equal to or larger than 0 km/h and equal to and smaller than 200 km/h which speed data can take is defined in the specifications, data of −10 km/h which is out of range of the value equal to or larger than 0 km/h and equal to or smaller than 200 km/h is considered to be falsified unauthenticated speed data. A processing load which the data format monitoring provides to the embedded control device 1020 is smaller than a processing load which the message authentication function, the packet monitoring, and the data encryption provide to the embedded control device 1020. It is possible to counteract the transmission of the unauthenticated data by the data format monitoring. Performed is the process of counteracting the transmission of the unauthenticated data by the data format monitoring which provides only a small processing load, because a degree of risk in a security is relatively low in receiving an unauthenticated message with a low receiving frequency.

The configuration content 1402 of the execution environment of the security function corresponding to the security risk state 1362 includes the upper limit of the usage rate of the CPU cores 1020, 1021, 1022, and 1023, the operation mode of the CPU core, the upper limit of the used amount of the inter-core shared cache 1140, and the upper limit of the used amount of the inter-core shared memory 1160. The configuration content 1402 of the execution environment of the security function defines the execution environment of the security function necessary to execute the security function 1382.

The operation mode of the CPU core included in the configuration content 1402 of the execution environment of the security function is a normal mode. The reason thereof is that access to data having high confidentiality, such as a key, is not necessary.

The security risk state 1363 indicates that detected is an attack scenario leading to a hacking into a specific embedded control device or an impersonation of a specific embedded control device. The security risk state 1363 assumes a threat such as a transmission of the unauthenticated data for purpose of unauthenticated control of an automobile and an unauthenticated acquisition of data for purpose of a theft of secret data, for example.

When a program tries the hacking into the embedded control device or the impersonation of the embedded control device via an external network, there is an attack scenario and the program shows a behavior coinciding with the attack scenario. For example, the program trying the hacking into the embedded control device shows a behavior coinciding with attack scenarios (1), (2), (3), and (4) described hereinafter.

(1) The program acquires an IP address using a network inspection command.

(2) The program performs a port scan to specify a service provided from each port.

(3) The program transmits a plurality of packets to each port, and specifies a type and version number of software using each port in accordance with a response to the transmitted plurality of packets.

(4) When the type and version number of the specified software have vuln, the program hacks the embedded control device using the vuln therein.

Accordingly, the attack scenario leading to the hacking into the specific embedded control device and the impersonation of the specific embedded control device can be detected by monitoring the behavior indicated by the program and detecting the behavior coinciding with the attack scenario.

The security function 1383 corresponding to the security risk state 1363 includes a message authentication function and a data encryption. As described above, according to the message authentication function, the completeness of the message and the validity (authenticity) of the source of the message can be ensured, and it is possible to counteract the transmission of the unauthenticated data. As described above, according to the data encryption, the monitoring of transmitted-received data can be prevented, thus it is possible to counteract the unauthenticated acquisition of data.

The configuration content 1403 of the execution environment of the security function corresponding to the security risk state 1363 includes the upper limit of the usage rate of the CPU cores 1020, 1021, 1022, and 1023, the operation mode of the CPU core, the upper limit of the used amount of the inter-core shared cache 1140, and the upper limit of the used amount of the inter-core shared memory 1160. The configuration content 1403 of the execution environment of the security function defines the execution environment of the security function necessary to execute the security function 1383.

The operation mode of the CPU core included in the configuration content 1403 of the execution environment of the security function is a secure mode. Accordingly, access to a key necessary to execute the message authentication function and the data encryption can be achieved.

The security risk state 1364 included in the security function table 1340 indicates that the attack scenario leading to the unauthenticated acquisition of data is detected. The security risk state 1364 assumes the threat such as the unauthenticated acquisition of data for purpose of the theft of secret data, for example.

The security function 1384 corresponding to the security risk state 1364 includes the data encryption. As described above, according to the data encryption, the monitoring of transmitted-received data can be prevented, thus it is possible to counteract the unauthenticated acquisition of data.

The configuration content 1404 of the execution environment of the security function corresponding to the security risk state 1364 includes the upper limit of the usage rate of the CPU cores 1020, 1021, 1022, and 1023, the operation mode of the CPU core, the upper limit of the used amount of the inter-core shared cache 1140, and the upper limit of the used amount of the inter-core shared memory 1160. The configuration content 1404 of the execution environment of the security function defines the execution environment of the security function necessary to execute the security function 1384.

The operation mode of the CPU core included in the configuration content 1404 of the execution environment of the security function is a secure mode. Accordingly, access to a key necessary to execute the data encryption can be achieved.

The security risk state 1365 indicates that an unauthenticated connection of directly connecting an unauthenticated device to the control system network 1040 is performed. The security risk state 1365 assumes the threat such as the transmission of the unauthenticated data, the unauthenticated acquisition of data, and the execution of the unauthenticated program on the embedded control device 1020, for example. The execution of the unauthenticated program assumes that the unauthenticated program is installed in the embedded control device 1020 and the installed unauthenticated program is executed.

The security function 1385 corresponding to the security risk state 1365 includes the message authentication function, a resource monitoring, and the data encryption. As described above, according to the message authentication function, the completeness of the message and the validity (authenticity) of the source of the message can be ensured, and it is possible to counteract the transmission of the unauthenticated data. According to the resource monitoring, an execution profile of the program is monitored, and the execution of the program can be limited when the monitored execution profile shows the abnormal behavior, thus it is possible to counteract the execution of the unauthenticated program. The monitored execution profile is the usage rate of the CPU cores 1020, 1021, 1022, and 1023 and the used amount of the inter-core shared memory 1160, for example. As described above, according to the data encryption, the monitoring of transmitted-received data can be prevented, thus it is possible to counteract the unauthenticated acquisition of data.

The configuration content 1405 of the execution environment of the security function corresponding to the security risk state 1365 includes the upper limit of the usage rate of the CPU cores 1020, 1021, 1022, and 1023, the operation mode of the CPU core, the upper limit of the used amount of the inter-core shared cache 1140, and the upper limit of the used amount of the inter-core shared memory 1160. The configuration content 1405 of the execution environment of the security function defines the execution environment of the security function necessary to execute the security function 1385.

The operation mode of the CPU core included in the configuration content 1405 of the execution environment of the security function is a privileged mode. Achievable accordingly is access to a performance monitoring unit (PMU) incorporated into a CPU necessary to execute the resource monitoring.

1.4 Operation

Figure 5:
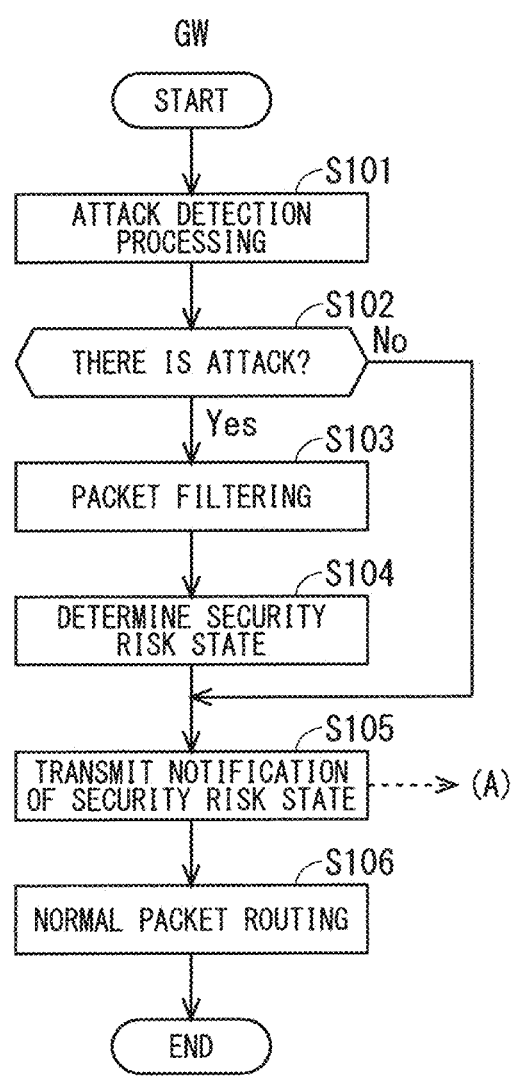
FIG. 5 A flow chart illustrating an operation of the GW in a case where the embedded device receives the cyber attack in the security device according to the embodiments 1 and 2.
Figure 6:
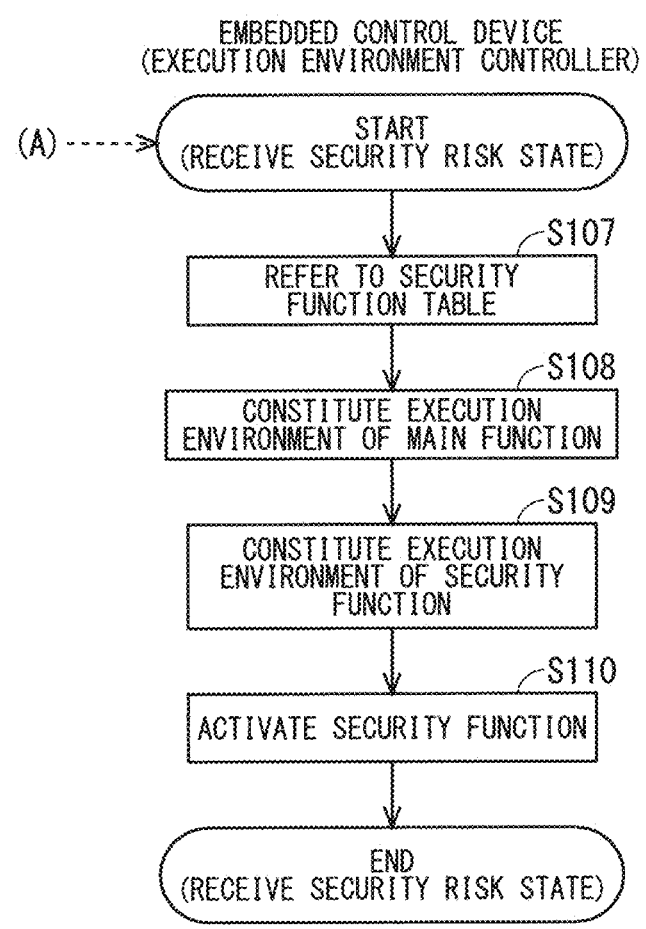
FIG. 6 A flow chart illustrating an operation of the embedded control device in a case where the embedded device receives the cyber attack in the security device according to the embodiments 1 and 2.

FIG. 5 is a flow chart illustrating an operation of the GW in a case where the embedded device receives the cyber attack in the security device according to the embodiment 1. FIG. 6 is a flow chart illustrating an operation of the embedded control device in a case where the embedded device receives the cyber attack in the security device according to the embodiment 1.

In Step S101 illustrated in FIG. 5, the attack detection part 1220 executes attack detection processing. In the attack detection processing, the cyber attack on the embedded device 1000 is detected.

In Step S102 subsequent to Step S101, a presence or absence of the attack is determined. When it is determined that the cyber attack is performed on the embedded device 1000 in Step S102, the process proceeds to Step S103. In the meanwhile, when it is determined that the cyber attack is not performed on the embedded device 1000 in Step S102, the process proceeds to Step S105.

When it is determined that the cyber attack is performed, the filtering part 1240 executes the packet filtering in Step S103, and the security risk state determination part 1260 determines the security risk state in Step S104 subsequent to Step S103. An unauthenticated packet is blocked by the packet filtering. The security risk state is determined from information indicating contents of the cyber attack.

In Step S105 subsequent to Step S102 or Step S104, the security risk state determination part 1260 transmits a notification of the security risk state to the embedded control device 1020. When it is determined that the cyber attack is performed on the embedded device 1000 in Step S102 and the security risk state is determined in Step S104, the security risk state transmitted for notification is the security risk state determined in Step S104. When it is determined that the cyber attack is not performed on the embedded device 1000 in Step S102, the security risk state transmitted for notification is the security risk state indicating that the cyber attack is not performed on the embedded device 1000.

The routing part 1200 executes a normal packet routing in Step S106 subsequent to Step S105. In the normal packet routing, a normal data which is not exposed to the cyber attack is routed to appropriate network.

The execution environment controller 1320 starts execution environment control processing including Steps S107 to Step 110 illustrated in FIG. 6 in synchronization with the reception of the security risk state. Asynchronous processing may be executed in place of the synchronous processing in which the execution environment control processing is started in synchronization with the reception of the security risk state. For example, the asynchronous processing in which the execution environment controller 1320 starts the execution environment control processing may be executed when the main function execution part 1280 starts executing the main function.

In Step S107, the execution environment controller 1320 refers to the security function table 1340. The execution environment controller 1320 acquires the configuration content of the execution environment of the security function corresponding to the security risk state transmitted for notification and the configuration content of the execution environment of the main function.

In Step S108 subsequent to Step S107, the execution environment controller 1320 constitutes the execution environment of the main function in accordance with the configuration content of the execution environment of the obtained main function. However, when there is no need to constitute the execution environment of the main function, Step S108 is not executed. For example, when the execution environment of the main function is automatically controlled by system software such as an operating system in accordance with a degree of priority of the CPU core allocated to the security function and a task executing the security function, Step S108 is not executed. The process of constituting the execution environment of the main function includes at least one of a core migration of the main function to the CPU core which does not execute the security function, a limitation of memory used amount, a limitation of CPU usage rate, a re-allocation of CPU core for interrupt, a re-allocation of CPU core for I/O, cache maintenance processing, and a resetting of a memory management unit (MMU).

In Step S109 subsequent to Step S108, the execution environment controller 1320 constitutes the execution environment of the security function in accordance with the configuration content of the execution environment of the obtained security function. The process of constituting the execution environment of the security function includes at least one of an allocation of CPU core executing the security function, a setting of the operation mode of the CPU, an allocation of CPU core for interrupt, a re-allocation of CPU core for I/O, and a setting of a cache lockdown.

In Step S110 subsequent to Step S109, the security function is activated.

1.5 Example of Changing Execution Environment

Figure 7:
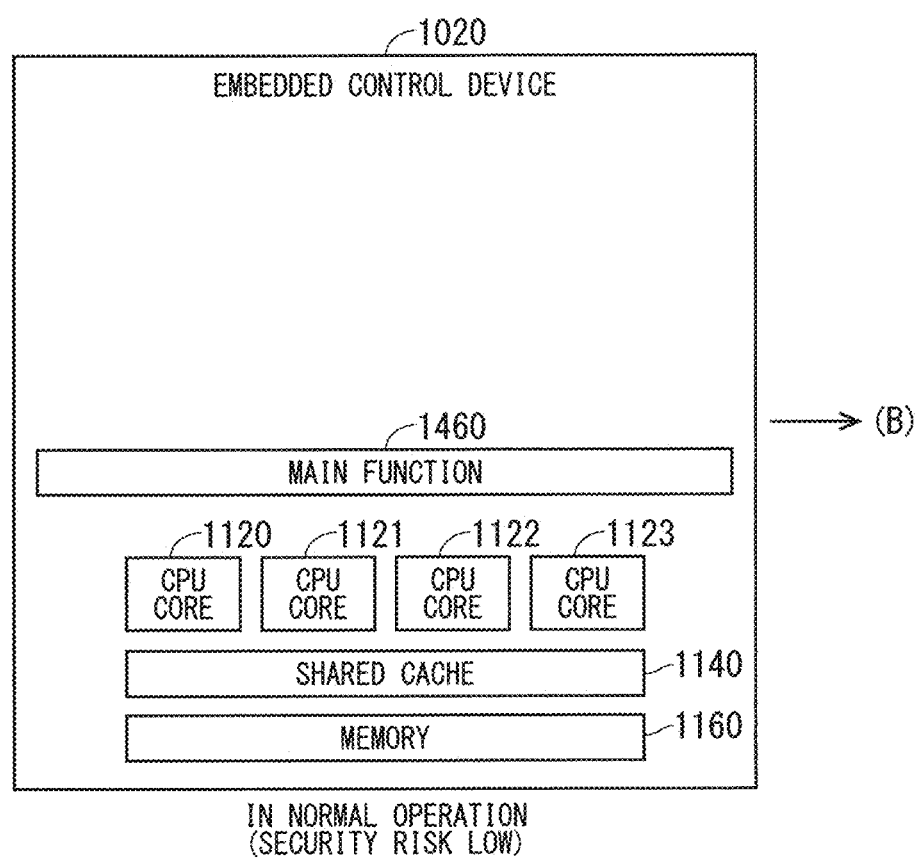
FIG. 7 A drawing schematically illustrating an example of changing an execution environment in the embedded device including the security device according to embodiments 1 and 2.
Figure 8:
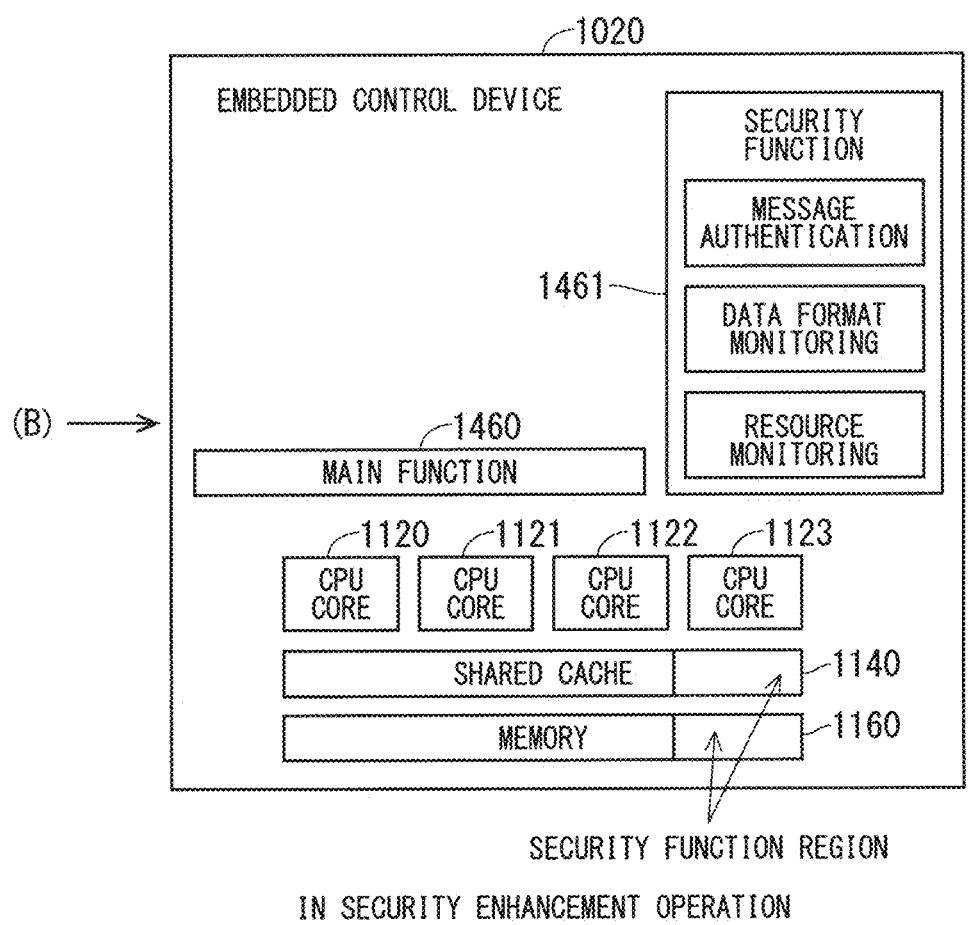
FIG. 8 A drawing schematically illustrating an example of changing an execution environment in the embedded device including the security device according to embodiments 1 and 2.

FIG. 7 and FIG. 8 are drawings each schematically illustrating an example of changing the execution environment in the embedded device including the security device according to the embodiment 1.

FIG. 7 illustrates a state where the determined security risk state is a low security risk state indicating that the cyber attack is not performed on the embedded device 1000. FIG. 7 illustrates a state where all of the computer resources mounted on the embedded control device 1020 is used for executing the main function 1460 in such a normal operation state.

FIG. 8 illustrates a state where the determined security risk state is the security risk state 1365. FIG. 8 illustrates a state where one CPU core 1123, part of the inter-core shared cache 1140, and part of the inter-core shared memory 1160 included in the computer resource mounted on the embedded control device 1020 are used for executing the security function 1461, and the remaining elements included in the computer resource mounted on the embedded control device 1020 are used for executing the main function 1460 in such a security enhancement operation.

1.6 Effect of Embodiment 1

In the embodiment 1, the execution environment of the security function in the embedded control device 1020 is constituted so that the embedded control device 1020 can execute the security function against the cyber attack in accordance with at least one of the type and degree of risk of threat in the security caused by the cyber attack. Thus, the security function can be appropriately executed while suppressing an influence on the execution of the main function in the embedded control device 1020. Particularly, a high degree of security function can be executed when there is a high risk in the security.

2 Embodiment 2

In the embodiment 1, the execution environment of the main function is constituted in accordance with the security risk state, however, the content of the main function is not influenced by the security risk state. In contrast, in an embodiment 2, the content of the main function is changed in accordance with the content of the security function in addition to the process that the execution environment of the main function is constituted in accordance with the security risk state.

Described hereinafter is a configuration of the embodiment 2 relating to a difference described above. With regard to a configuration with no description, the configuration adopted in the embodiment 1 is also adopted in the embodiment 2 as it is or after a modification.

Figure 9:
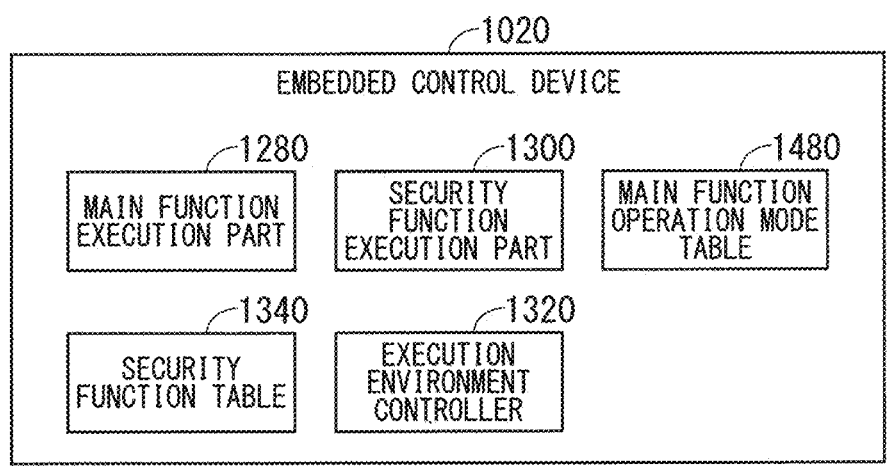
FIG. 9 A block diagram schematically illustrating the embedded control device constituting the security device according to the embodiment 2.

FIG. 9 is a block diagram schematically illustrating the embedded control device constituting the security device according to the embodiment 2.

The embedded control device 1020 illustrated in FIG. 9 includes the main function execution part 1280, the security function execution part 1300, and the execution environment controller 1320 in the manner similar to the embodiment 1. A storage medium such as the ROM 1180 stores a security function table 1340 in the embedded control device 1020 in the manner similar to the embodiment 1. In addition, a storage medium such as the ROM 1180 stores a main function operation mode table 1480 in the embedded control device 1020.

The execution environment controller 1320 determines the operation mode of the main function so that the function can be executed by a computer resource of the embedded control device 1020 which can be allocated to the main function when constituting the execution environment of the security function. The execution environment controller 1320 constitutes the execution environment of the main function in the embedded control device 1020 so that the main function can be executed in the determined operation mode of the main function.

Figure 10:
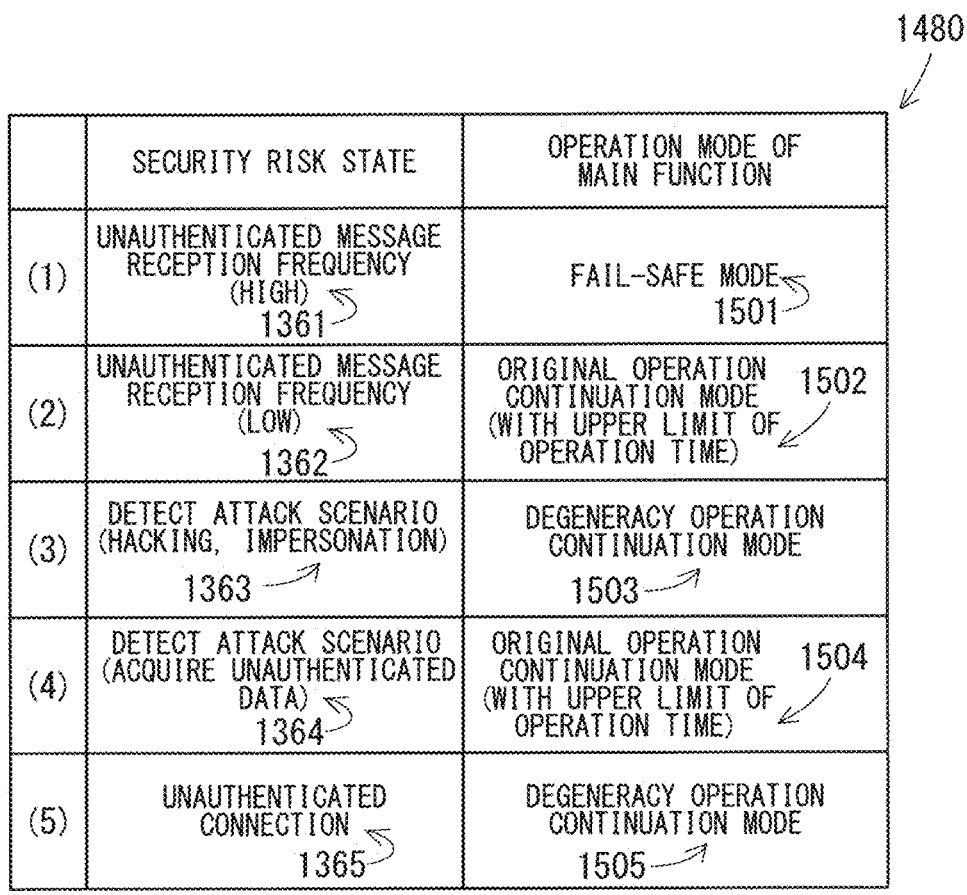
FIG. 10 A drawing schematically illustrating a main function operation mode table stored in the embedded control device constituting the security device according to the embodiment 2.

FIG. 10 is a drawing schematically illustrating a main function operation mode table stored in the embedded control device constituting the security device according to the embodiment 2.

The execution environment controller 1320 refers to the main function operation mode table 1480 illustrated in FIG. 10 in determining the operation mode of the main function.

The main function operation mode table 1480 includes a plurality of security risk states 1361, 1362, 1363, 1364, and 1365. The main function operation mode table 1480 includes a plurality of operation modes 1501, 1502, 1503, 1504, and 1505 of the main function corresponding to a plurality of security risk states 1361, 1362, 1363, 1364, and 1365, respectively.

The operation mode of the main function corresponding to each security risk state of the plurality of security risk states 1361, 1362, 1363, 1364, and 1365 is determined so that the operation mode can be executed by the computer resource which is not allocated to the security function corresponding to each security risk state but can be allocated to the main function.

The execution environment controller 1320 refers to the main function operation mode table 1480, and selects the security risk state coinciding with the security risk state determined by the security risk state determination part 1260 from the plurality of security risk states 1361, 1362, 1363, 1364, and 1365 included in the main function operation mode table 1480. The execution environment controller 1320 selects the operation mode of the main function corresponding to the selected security risk state from the plurality of operation modes 1501, 1502, 1503, 1504, and 1505 of the main function included in the main function operation mode table 1480.

The main function execution part 1280 executes a main function in the selected operation mode of the main function.

According to the above configuration, the operation mode of the main function is determined in accordance with the security risk state determined by the security risk state determination part 1260. As described in the embodiment 1, the execution environment of the main function is constituted in accordance with the security risk state determined by the security risk state determination part 1260, thus in the execution environment of the main function, the main function can be executed in the operation mode of the determined main function.

The execution environment controller 1320 preferably determines the operation mode of the main function to satisfy the request in the security in the security risk state determined by the security risk state determination part 1260 when constituting the execution environment of the security function. Accordingly, even though there is one operation mode of the main function which can be executed by the computer resource, when the one operation mode of the main function does not satisfy the request in the security in the security risk state determined by the security risk state determination part 1260, the one operation mode of the main function is not adopted, but the other operation mode of the main function having a lower function than the one operation mode of the main function and satisfying the request in the security in the security risk state is adopted.

2.1 Main Function Operation Mode Table

The operation mode 1501 of the main function corresponding to the security risk state 1361 illustrated in FIG. 10 is a fail-safe mode. In the fail-safe mode, the execution of the main function is not stopped rapidly, but is stopped in stages. The fail-safe mode is adopted when the execution environment of the main function has a capacity of executing the main function but has difficulty in continuing the execution of the main function for a long time.

Each of the operation modes 1503 and 1505 of the main function corresponding to the security risk states 1363 and 1365, respectively, is a degeneracy operation continuation mode. In the degeneracy operation continuation mode, the main function is degenerated and part of execution of the main function is continued. The degeneracy operation continuation mode is adopted when the execution environment of the main function can execute the main function, but has difficulty in executing the whole main function due to the limitation of the computer resource, thus needs to execute only part of the main function.

Each of the operation modes 1502 and 1504 of the main function corresponding to the security risk states 1362 and 1364, respectively, is an original operation continuation mode having the upper limit of the operation time. In the original operation continuation mode, the whole execution of the main function is continued. The original operation continuation mode having an upper limit of an operation time is adopted when the execution environment of the main function can execute the main function and the computer resource is sufficiently allocated to the main function, however, it is expected that the computer resource becomes insufficient in a case where the execution of the main function is continued for a long time and stability of the embedded control device 1020 is reduced.

When the security risk state determination part 1260 does not determine that the risk in the security is resolved and the security risk state determined by the security risk state determination part 1260 does not change to the security risk state in a case where the cyber attack is not performed on the embedded device 1000 even though the time for the continuation of executing the main function in the degeneracy operation continuation mode exceeds the upper limit of the operation time, the operation mode of the main function makes a transition from the original operation continuation mode having the upper limit of the operation time to the degeneracy operation continuation mode or the fail-safe mode.

2.2 Operation

Figure 11:
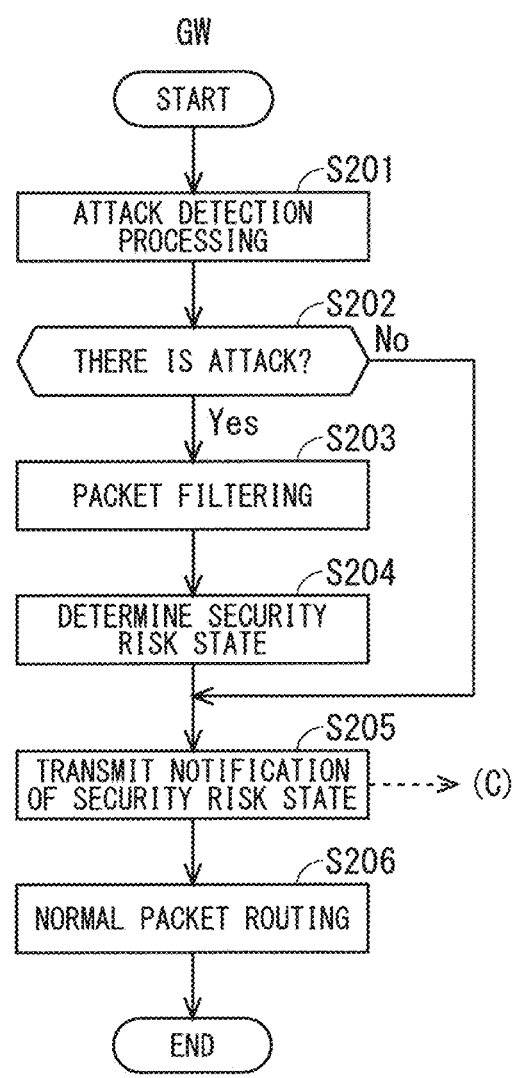
FIG. 11 A flow chart illustrating an operation of the GW in a case where the embedded device receives the cyber attack in the security device according to the embodiment 2.
Figure 12:
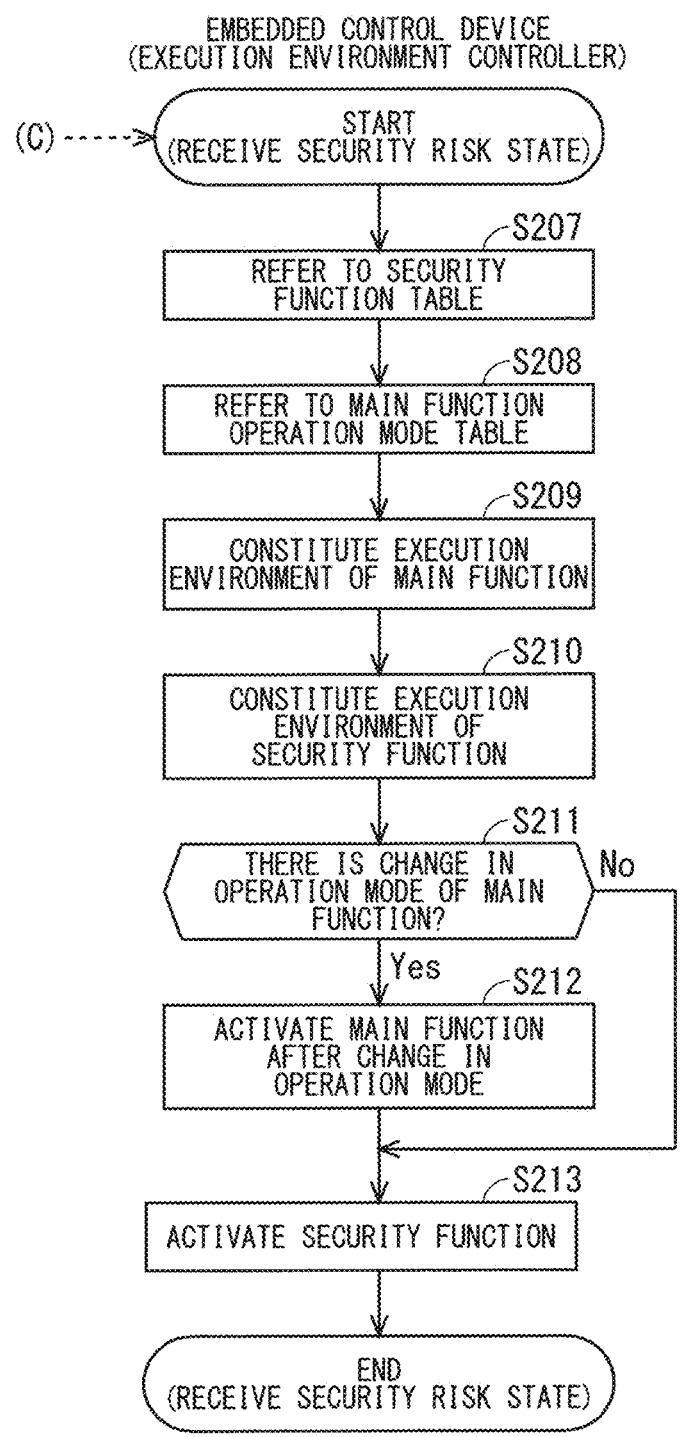
FIG. 12 A flow chart illustrating an operation of the embedded control device in a case where the embedded device receives the cyber attack in the security device according to the embodiment 2.

FIG. 11 is a flow chart illustrating an operation of the GW in a case where the embedded device receives the cyber attack in the security device according to the embodiment 2. FIG. 12 is a flow chart illustrating an operation of the embedded control device in a case where the embedded device receives the cyber attack in the security device according to the embodiment 2.

Steps S201 to S206 illustrated in FIG. 11 are similar to Steps S101 to S106 illustrated in FIG. 5, respectively.

The execution environment controller 1320 starts execution environment control processing including Steps S207 to Step 213 illustrated in FIG. 12 in synchronization with the reception of the security risk state.

In Step S207, the execution environment controller 1320 refers to the security function table 1340. The execution environment controller 1320 acquires the configuration content of the execution environment of the security function corresponding to the security risk state transmitted for notification and the configuration content of the execution environment of the main function.

In Step S208 subsequent to Step S207, the execution environment controller 1320 refers to the main function operation mode table 1480. The execution environment controller 1320 acquires the operation mode of the main function corresponding to the security risk state transmitted for notification.

In Step S209 subsequent to Step S208, the execution environment controller 1320 constitutes the execution environment of the main function in accordance with the configuration content of the execution environment of the obtained main function.

In Step S210 subsequent to Step S209, the execution environment controller 1320 constitutes the execution environment of the security function in accordance with the configuration content of the execution environment of the obtained security function.

In Step S211 subsequent to Step S210, a presence or absence of the change in the operation mode of the main function is determined. When it is determined that the operation mode of the main function is changed in Step S211, the process proceeds to Step S212. When it is determined that the operation mode of the main function is not changed in Step S211, the process proceeds to Step S213.

When it is determined that the operation mode of the main function is changed, the main function is activated in the changed operation mode of the main function in Step S212.

In Step S213 subsequent to Step S211 or S212, the security function is activated.

Figure 13:
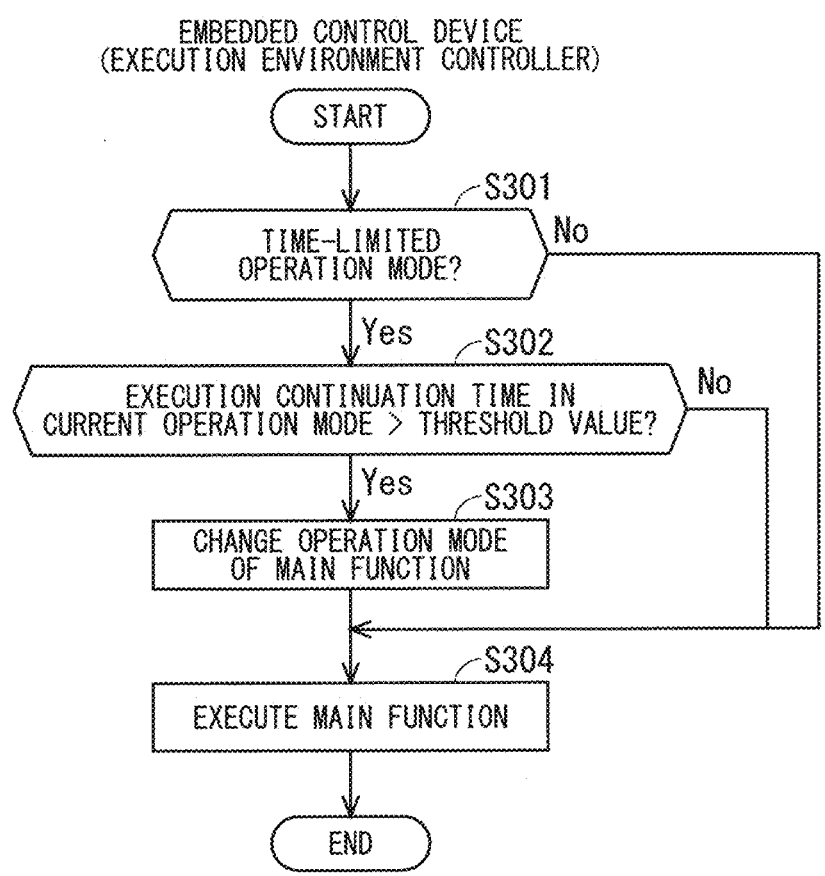
FIG. 13 A flow chart illustrating an operation of the embedded control device in a case where the embedded control device executes a main function in the security device according to the embodiment 2.

FIG. 13 is a flow chart illustrating an operation of the embedded control device in a case where the embedded control device executes the main function in the security device according to the embodiment 2.

In Step S301, the main function execution part 1280 determines whether or not the current operation mode of the main function is a time-limited operation mode after the main function is activated. In the example described above, the original operation continuation mode having the upper limit of the operation time falls under the time-limited operation mode. When it is determined that the current operation mode of the main function is the time-limited operation mode in Step S301, the process proceeds to Step S302. When it is determined that the current operation mode of the main function is not the time-limited operation mode in Step S301, the process proceeds to Step S304.

In Step S302, the main function execution part 1280 determines whether or not an execution continuation time for the continuation of executing the main function in the current operation mode of the main function exceeds a preset threshold value. When it is determined in Step S302 that the time for the continuation of executing the main function in the current operation mode of the main function exceeds the threshold value, the process proceeds to Step S303. When it is determined in Step S302 that the time for the continuation of executing the main function in the current operation mode of the main function does not exceed the threshold value, the process proceeds to Step S304.

When it is determined that the current operation mode of the main function is the time-limited operation mode and the time for the continuation of executing the main function in the current operation mode of the main function exceeds the threshold value, in Step S303, the main function execution part 1280 changes the operation mode of the main function from the time-limited operation mode to the other operation mode having a lower function than the time-limited operation mode and having a lower risk in the security than the time-limited operation mode. In the example describe above, the fail-safe mode and the degeneracy operation continuation mode fall under the other operation mode.

The main function execution part 1280 executes the main function in Step S304. When the current operation mode of the main function is not the time-limited operation mode, or when the current operation mode of the main function is the time-limited operation mode but the execution continuation time does not exceed the threshold value, the main function is executed in the current operation mode of the main function. When the current operation mode of the main function is the time-limited operation mode and when the execution continuation time exceeds the threshold value, the main function is executed in the other operation mode.

Accordingly, the main function execution part 1280 can execute the main function in the time-limited operation mode and the other operation mode having the lower function than the time-limited operation mode and having the lower risk in the security than the time-limited operation mode. When the time for the continuation of executing the main function in the time-limited operation mode exceeds the threshold value without the change in the security risk state after the operation mode of the main function enters the time-limited operation mode, the operation mode of the main function is changed from the time-limited operation mode to the other operation mode.

2.3 Effect of Embodiment 2

Also in the embodiment 2, the execution environment of the security function in the embedded control device 1020 is constituted so that the embedded control device 1020 can execute the security function against the cyber attack in accordance with at least one of the type and degree of risk of threat in the security caused by the cyber attack in the manner similar to the embodiment 1. Thus, the security function can be appropriately executed while suppressing an influence on the embedded control device 1020 in executing the main function. Particularly, a high degree of security function can be executed when there is a high risk in the security.

In addition, in the embodiment 2, the operation mode of the main function is changed, thus suppressed is an unexpected unauthenticated operation caused by a shortage of the computer resource at the time of executing the main function, and reliability of the embedded control device 1020 can be improved.

According to the present invention, each embodiment can be appropriately varied or omitted within the scope of the invention.

The present invention has been shown and described in detail, the foregoing description is in all aspects illustrative and not restrictive. It is therefore understood that numerous modifications and variations can be devised without departing from the scope of the invention.

EXPLANATION OF REFERENCE SIGNS

1000 embedded device, 1020 embedded control device, 1080 gateway (GW), 1110 security device, 1220 attack detection part, 1260 security risk state determination part, 1280 main function execution part, 1300 security function execution part, 1320 execution environment controller, 1340 security function table, 1480 main function operation mode table.

The invention claimed is:

1. A security device, comprising:
  processing circuitry configured to
    detect a cyber attack on an embedded device controlled by an embedded control device to determine a security risk state indicating at least one of a type and a degree of risk of threat in security to the embedded device caused by the cyber attack based on a result of the detection of the cyber attack by the processing circuitry of the security device;
    determine a security function against the cyber attack in accordance with the security risk state;
    constitute a first execution environment of the security function in the embedded control device so that the embedded control device executes the security function to counter the cyber attack; and
    based on the detected security risk state, dynamically constitute a second execution environment of a main function of the embedded device in which to execute the main function in parallel with the security function executing in the first execution environment to counter the cyber attack,
  wherein the execution environments of the first execution environment of the security function and the second execution environment of the main function are respective operation environments of the embedded control device necessary to execute the security function and the main function.

2. The security device according to claim 1, wherein the processing circuitry
  determines an operation mode of the main function of the embedded device so that the main function is executed by a computer resource of the embedded control device allocated to the main function controlling the embedded device when constituting the first execution environment of the security function, and
  constitutes the second execution environment of the main function in the embedded control device so that the main function is executed in the operation mode of the main function.

3. The security device according to claim 2, wherein the processing circuitry determines the operation mode of the main function to satisfy a request in security in the security risk state when constituting the first execution environment of the security function.

4. The security device according to claim 2, wherein the processing circuitry
  executes the operation mode of the main function in one of a time-limited operation mode and another operation mode, which has a lower function than the time-limited operation mode and has a lower risk in security than the time-limited operation mode, and
  changes the operation mode of the main function from the time-limited operation mode to the another operation mode when a time for a continuation of executing the main function in the time-limited operation mode exceeds a threshold value without a change in the security risk state after the operation mode of the main function enters the time-limited operation mode.

5. The security device according to claim 1, wherein the constituting of the first execution environment of the security function includes at least one of an allocation of a CPU core executing the security function, a setting of the operation mode of a CPU, an allocation of a CPU core for interrupt, a re-allocation of a CPU core for I/O, and a setting of a cache lockdown.

6. The security device according to claim 1, wherein the constituting of the second execution environment of the main function includes at least one of a core migration of the main function to a CPU core which does not execute the security function, a limitation of a memory used amount, a limitation of a CPU usage rate, a re-allocation of a CPU core for interrupt, a re-allocation of a CPU core for I/O, cache maintenance processing, and a resetting of a memory manager.

7. An embedded device comprising:
a security device including:
processing circuitry configured to
detect a cyber attack on an embedded device controlled by an embedded control device to determine a security risk state indicating at least one of a type and a degree of risk of threat in security to the embedded device caused by the cyber attack based on a result of the detection of the cyber attack by the processing circuitry of the security device;
determine a security function against the cyber attack in accordance with the security risk state;
constitute a first execution environment of the security function in the embedded control device so that the embedded control device executes the security function to counter the cyber attack; and
based on the detected security risk state, dynamically constitute a second execution environment of a main function of the embedded device in which to execute the main function in parallel with the security function executing in the first execution environment to counter the cyber attack,
wherein the execution environments of the first execution environment of the security function and the second execution environment of the main function are respective operation environments of the embedded control device necessary to execute the security function and the main function.

8. The embedded device according to claim 7, wherein the processing circuitry of the security device
determines an operation mode of the main function of the embedded device so that the main function is executed by a computer resource of the embedded control device allocated to the main function controlling the embedded device when constituting the first execution environment of the security function, and
constitutes the second execution environment of the main function in the embedded control device so that the main function is executed in the operation mode of the main function.

9. The embedded device according to claim 8, wherein the processing circuitry of the security device determines the operation mode of the main function to satisfy a request in security in the security risk state when constituting the first execution environment of the security function.

10. The embedded device according to claim 8, wherein the processing circuitry
executes the operation mode of the main function in one of a time-limited operation mode and another operation mode, which has a lower function than the time-limited operation mode and has a lower risk in security than the time-limited operation mode, and
changes an operation mode of the main function from the time-limited operation mode to the another operation mode when a time for a continuation of executing the main function in the time-limited operation mode exceeds a threshold value without a change in the security risk state after the operation mode of the main function enters the time-limited operation mode.

11. The embedded device according to claim 7, wherein the constituting of the first execution environment of the security function includes at least one of an allocation of a CPU core executing the security function, a setting of the operation mode of a CPU, an allocation of a CPU core for interrupt, a re-allocation of a CPU core for I/O, and a setting of a cache lockdown.

12. The embedded device according to claim 7, wherein the constituting of the second execution environment of the main function includes at least one of a core migration of the main function to a CPU core which does not execute the security function, a limitation of a memory used amount, a limitation of a CPU usage rate, a re-allocation of a CPU core for interrupt, a re-allocation of a CPU core for I/O, cache maintenance processing, and a resetting of a memory manager.

* * * * *